United States Patent
Li et al.

(10) Patent No.: US 8,582,304 B2
(45) Date of Patent: Nov. 12, 2013

(54) FIXING APPARATUS FOR STORAGE DEVICE

(75) Inventors: Xiao-Zheng Li, Shenzhen (CN);
Guang-Yi Zhang, Shenzhen (CN);
Wen-Tang Peng, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 165 days.

(21) Appl. No.: 13/211,283

(22) Filed: Aug. 16, 2011

(65) Prior Publication Data

US 2013/0037673 A1 Feb. 14, 2013

(30) Foreign Application Priority Data

Aug. 8, 2011 (CN) .......................... 2011 1 0225619

(51) Int. Cl.
*H05K 7/16* (2006.01)
(52) U.S. Cl.
USPC .................. 361/726; 248/222.13; 248/222.52; 312/223.2; 361/732
(58) Field of Classification Search
USPC .......................... 361/615, 616, 726, 730, 732; 312/223.2, 265.5, 265.6; 248/27.1, 248/27.3, 220.21, 220.22, 221.11, 222.13, 248/222.52, 222.41, 223.21, 225.11
See application file for complete search history.

(56) References Cited

U.S. PATENT DOCUMENTS

| | | | | |
|---|---|---|---|---|
| 4,930,694 | A * | 6/1990 | Yoshitake et al. | 224/547 |
| 6,452,792 | B1 * | 9/2002 | Chen | 361/679.35 |
| 6,944,013 | B2 * | 9/2005 | Yang | 361/679.33 |
| 7,440,271 | B2 * | 10/2008 | Chen et al. | 361/679.33 |
| 7,440,272 | B2 * | 10/2008 | Chen et al. | 361/679.33 |
| 7,495,907 | B2 | 2/2009 | Peng et al. | |
| 7,630,197 | B2 * | 12/2009 | Chen | 361/679.33 |

FOREIGN PATENT DOCUMENTS

| | | |
|---|---|---|
| TW | M313407 U | 6/2007 |
| TW | I328152 B | 8/2010 |

* cited by examiner

*Primary Examiner* — Alfred J Wujciak
(74) *Attorney, Agent, or Firm* — Altis & Wispro Law Group, Inc.

(57) ABSTRACT

A fixing apparatus includes a board presenting a number of engaging portions and a post, and a casing for containing a data storage device. The casing includes a bottom wall defining a number of engaging holes, an end wall perpendicularly connected to the bottom wall, and a fixing member pivotably mounted to the end wall. Each engaging hole may engage and lock an engaging portion. The fixing member forms a sliding portion having a slanted outer surface, and a protrusion connected to the sliding portion and is pivoted to move the casing away from the post, until the second holes engage with the corresponding engaging portions, and the protrusion resists against the post.

10 Claims, 3 Drawing Sheets

FIXING APPARATUS FOR STORAGE DEVICE

BACKGROUND

1. Technical Field

The present disclosure relates to an apparatus for fixing a data storage device.

2. Description of Related Art

An electronic device, such as a computer, is generally equipped with a data storage device, such as a hard disk drive. Mounting the storage device to the electronic device by screws is inefficient and always requires a tool, such as a screw driver, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
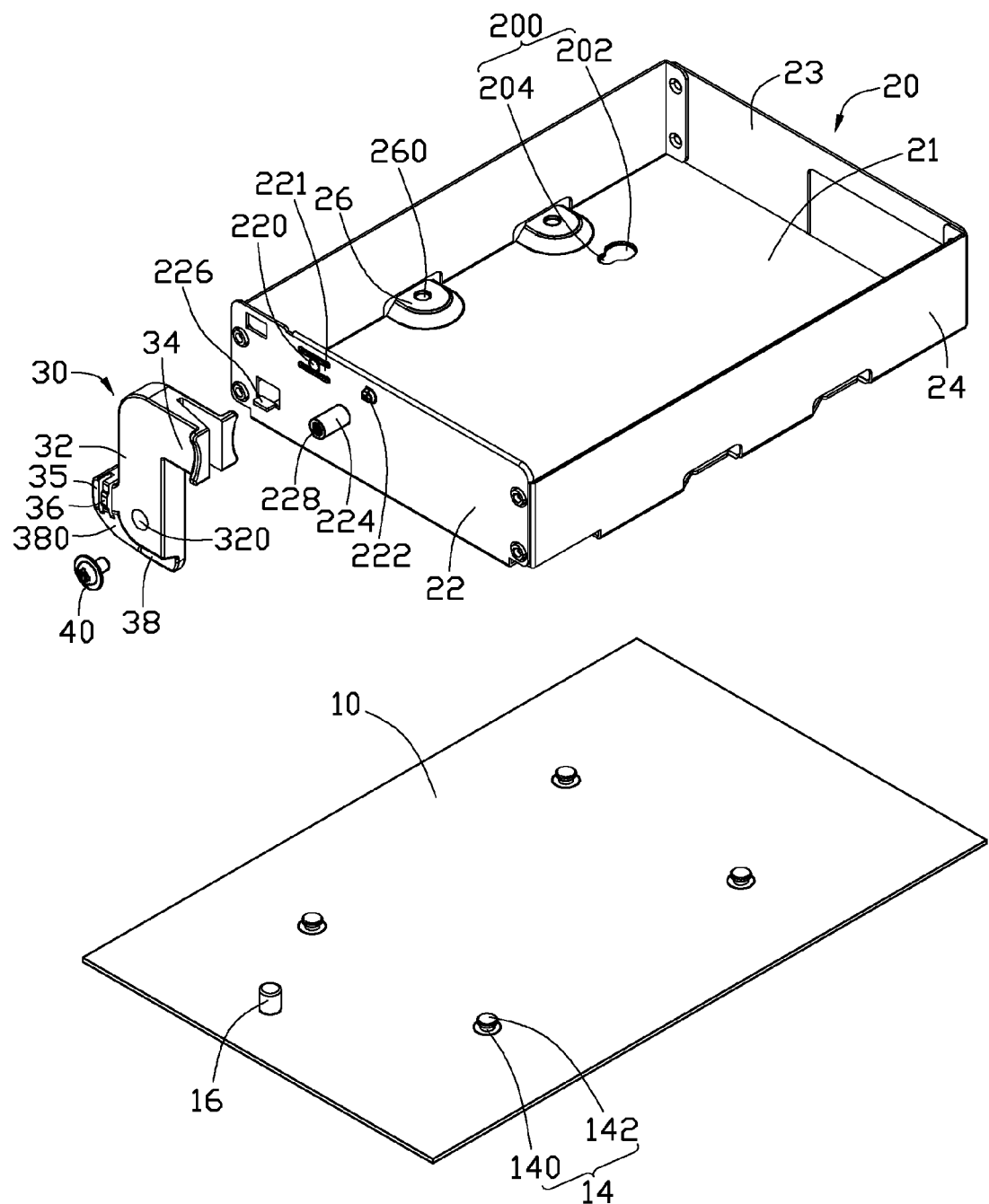
FIG. 1 is an exploded, isometric view of an exemplary embodiment of a device for fixing a storage device.

Referring to FIG. 1, an exemplary embodiment of a fixing apparatus for fixing a data storage device, such as a hard disk drive, includes a board 10, a casing 20 for receiving the data storage device, and a fixing member 30.

The board 10 presents four engaging portions 14 arranged adjacent to the four corners of a rectangular plate and a post 16 outside the internal rectangle formed by the engaging portions 14. Each engaging portion 14 includes a neck 140 extending in a substantially perpendicular manner from the board 10 and a head 142 mounted to the distal end of the neck 140. The diameter of the head 142 is greater than the diameter of the neck 140.

The casing includes a bottom wall 21, a front wall 22 and a back wall 23 extending in a substantially perpendicular manner from the ends of the bottom wall 21, and two sidewalls 24 extending in a substantially perpendicular manner from the sides of the bottom wall 21. A pair of supporting portions 26 protrudes from the bottom wall 21, adjacent to each sidewall 24. Each supporting portion 26 defines a fixing hole 260 in the top of the supporting portion 26.

The bottom wall 21 defines four engaging holes 200 to accomodate the engaging portions 14. Each engaging hole 200 includes a first hole 202 adjacent to the back wall 23, and a second hole 204 away from the back wall 23 and communicating with the first hole 202. The size of the first hole 202 is substantially greater than the size of the second hole 204.

A resilient piece 221 is formed on the front wall 22. A hemispherical projection 220 protrudes from an outer surface of the resilient piece 221. The projection 220 is disposed substantially between a tab 226 and a blocking portion 222 which extend out from the front wall 22. A threaded sleeve 224 axially defining a threaded hole 228 extends from the outer surface of the front wall 22. The threaded sleeve 224 is located below the projection 220 and between it and the blocking portion 222.

The fixing member 30 includes a substantially rectangular main body 32. An operation portion 34 extends in a substantially perpendicular manner from a end of the main body 32. A protrusion 35 extends in a substantially perpendicular manner from the other end of the main body 32. The protrusion 35 extends away from the operation portion 34. An elastic portion 36 protrudes from the front surface of the protrusion 35. A flat piece 38 extends down from the second end of the main body 32. A sliding portion 380 extends down from the main body 32, and is connected between the flat piece 38 and the protrusion 35, the sliding portion 380 functions as a slanting wedge. An outer surface of the sling portions 380 is slanted from the flat piece 38 to the protrusion 35. A through hole 320 is defined in the main body 32, the distance between the operation portion 34 and the through hole 320 is greater than the distance between the flat piece 38 and the through hole 320.

Figure 2:
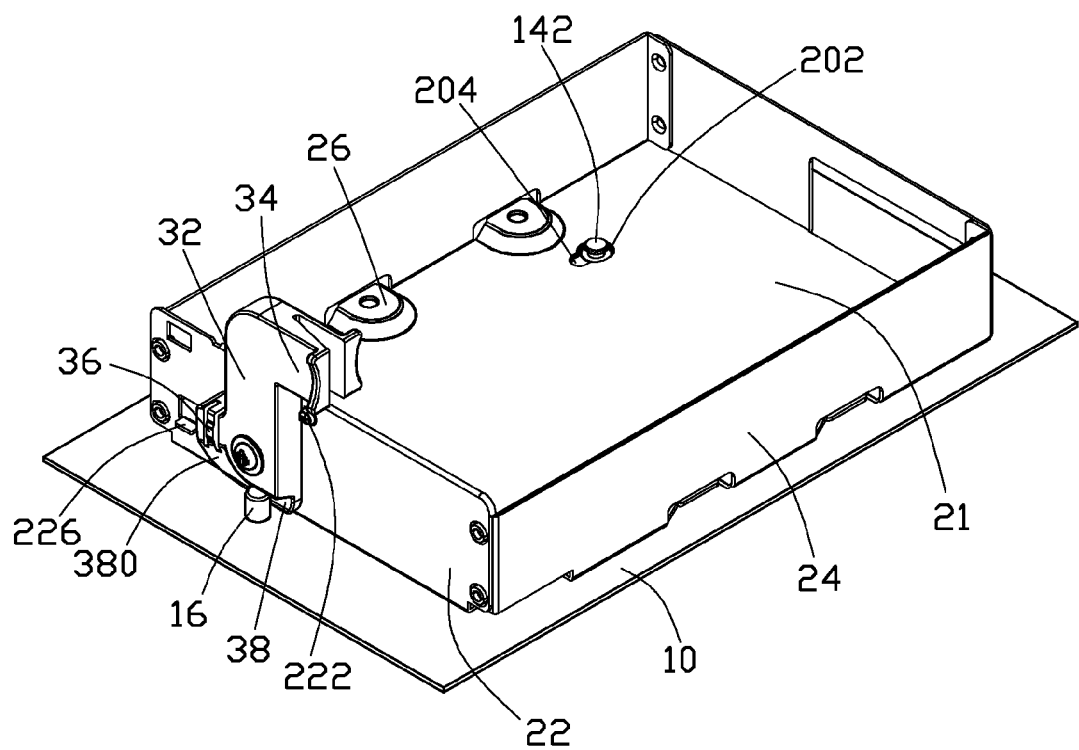
FIG. 2 is an isometric view of FIG. 1 in an assembled state.
Figure 3:
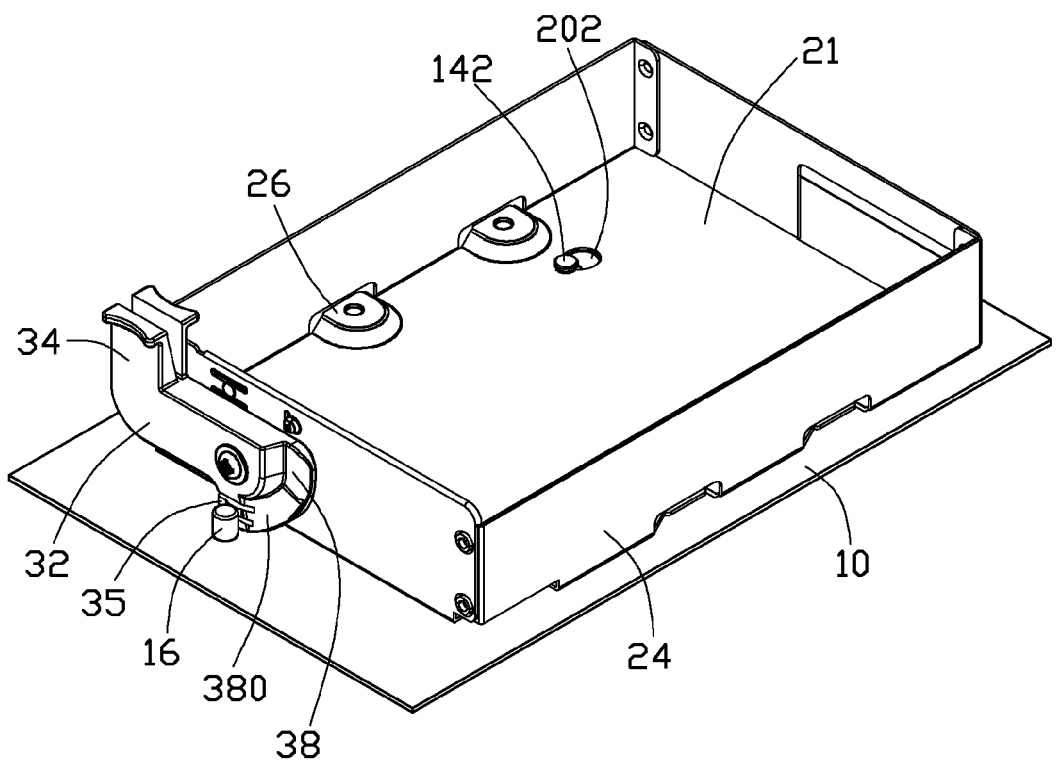
FIG. 3 is similar to FIG. 2, but showing another state of use.

Referring to FIGS. 2 and 3, in assembly, the threaded sleeve 224 extends through the through hole 320. A fastener 40 engages in the threaded hole 228 to secure the fixing member 30, thereby pivotably mounting the fixing member 30 to the front wall 22. At this time, the rotation of the main body 32 is limited by the projection 220 and the blocking portion 222. The data storage device (not shown) is supported and fixed on the supporting portions 26. The casing 20 (with the storage device within) is placed on the board 10 so that the engaging portions 14 extend into the corresponding first holes 202. The flat piece 38 is located between the post 16 and the front wall 22.

In use, the fixing member 30 is rotated to make the operation portion 34 move toward the tab 226, until the side of the main body 32 having the protrusion 35 abuts again the tab 226. The flat piece 38 and the sliding portion 380 cause the casing 20 to move away from the post 16, until all of the necks 140 are received in the corresponding second holes 204. At this time, the post 16 abuts the elastic portion 36. The heads 142 are blocked by an inner surface of the bottom wall 21.

In disengaging the casing 20 from the board 10, the fixing member 30 is rotated to make the operation portion 34 move toward the blocking portion 222, until the main body 32 is sandwiched between the projection 220 and the blocking portion 222. At this time, the flat piece 38 moves between the post 16 and the front wall 22. Move the casing 20 toward the post 16 with human hand, until the engaging portions 14 move into the corresponding first holes 202.

As the supporting portions 26 protrude from the bottom wall 21, the bottom of the storage device is never in contact with the bottom wall 21.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A fixing apparatus for storing an electronic device, comprising:

a board forming a plurality of engaging portions and a post all extending up from the board;

a casing comprising a bottom wall defining a plurality of engaging holes, and an end wall extending in a substantially perpendicular manner from the bottom wall; each engaging hole comprising a first hole and a corresponding second hole communicating with the first hole; wherein the size of the first hole is greater than the size of the second hole; and a fixing member pivotably mounted to the end wall, a sliding portion extending from a first end of the fixing member, a protrusion extending from the first end of the fixing member and connected to a first side of the sliding portion, wherein an outer surface of the sliding portion is slanted from the first side of the siding portion to a second side of the sliding portion opposite to the first side;

wherein when mounting the casing to the board, the engaging portions extend into the corresponding first holes, the fixing member is pivoted to drive the sliding portion to slide over the post, the slanted outer surface of the sliding portion slidably abutting the post to move the casing away from the post, until the engaging portions engage in the corresponding second holes, and the protrusion resists against the post.

2. The fixing apparatus of claim 1, further comprising a fastener, wherein the fixing member comprises a main body defining a through hole, the sliding portion extends from a first end of the main body, a threaded sleeve extends out from the end wall to pivotably extend through the through hole, the fastener engages with a distal end of the threaded sleeve opposite to the end wall to block the fixing member.

3. The fixing apparatus of claim 2, wherein the end wall forms a projection and a blocking portion above the threaded sleeve and at opposite sides of the threaded sleeve to sandwich the main body when the sliding portion is located between the post and the end wall.

4. The fixing apparatus of claim 3, wherein the end wall forms a tab at a side of the threaded sleeve to block the main body when the post resists against the protrusion.

5. The fixing apparatus of claim 2, wherein an operation portion extends from a second end of the main body opposite to the first end of the main body.

6. The fixing apparatus of claim 5, wherein the distance between the operation portion and the through hole is greater than the distance between the first end of the main body and the through hole.

7. The fixing apparatus of claim 1, wherein each engaging portion comprises a neck extending from the bottom wall, and a head extending from a distal end of the neck opposite to the bottom wall, when the neck is received in the corresponding second hole, the head is blocked by an inner surface of the bottom wall.

8. The fixing apparatus of claim 1, wherein a plurality of supporting portions protrudes up from the bottom wall.

9. The fixing apparatus of claim 1, wherein an elastic portion extends from the protrusion to abut the post.

10. The fixing apparatus of claim 1, wherein the second hole of each engaging hole is closer to the end wall than the corresponding first hole of each engaging hole.

* * * * *